US009934391B2

(12) United States Patent
McClintock (10) Patent No.: US 9,934,391 B2
(45) Date of Patent: *Apr. 3, 2018

(54) ESTABLISHING TRUST USING SIDE CHANNELS (71) Applicant: Amazon Technologies, Inc., Seattle, WA (US)

(72) Inventor: Jon Arron McClintock, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 14/921,263

(22) Filed: Oct. 23, 2015

(65) Prior Publication Data

US 2016/0042189 A1 Feb. 11, 2016

Related U.S. Application Data (63) Continuation of application No. 13/974,378, filed on Aug. 23, 2013, now Pat. No. 9,171,164.

(51) Int. Cl.
*G06F 21/62* (2013.01)
*G06F 21/57* (2013.01)
*G06F 21/55* (2013.01)

(52) U.S. Cl.
CPC ............ *G06F 21/62* (2013.01); *G06F 21/556* (2013.01); *G06F 21/57* (2013.01); *G06F 2221/034* (2013.01)

(58) Field of Classification Search
CPC ......... G06F 21/62; G06F 21/556; G06F 21/57
See application file for complete search history.

(56) References Cited

U.S. PATENT DOCUMENTS

| 7,152,244 | B2 | 12/2006 | Toomey |
| 7,995,196 | B1 | 8/2011 | Fraser |
| 8,615,579 | B1 | 12/2013 | Vincent et al. |
| 2011/0029797 | A1 | 2/2011 | Vaden |
| 2013/0291056 | A1 | 10/2013 | Gaudet et al. |
| 2013/0007473 | A1 | 12/2013 | van der Lee |
| 2014/0108775 | A1 | 4/2014 | Kludy et al. |
| 2014/0115623 | A1* | 4/2014 | Rajgopal ............ H04N 21/835 725/25 |

OTHER PUBLICATIONS

Ristenpart et al. (Hey, You, Get off of My Cloud: Exploring Information Leakage in Third-Party Compute Clouds, CCS'09, Nov. 9-13, 2009, 14 pages).*
Zhang et al. (HomeAlone: Co-Residency Detection in the Cloud via Side-Channel Analysis, 2011 IEEE, pp. 313-328).*
Redshift (Amazon Redshift Database Developer Guide Unloading Encrypted Data Files, Dec. 1, 2012, p. 208).*
Zhang et al., "Cross-VM Side Channels and Their Use to Extract Private Keys," CCS '12, Oct. 16-18, 2012, Raleigh, NC, US.

* cited by examiner

*Primary Examiner* — Oleg Korsak
(74) *Attorney, Agent, or Firm* — Thomas | Horstemeyer, LLP; Michael J. D'Aurelio; Jason M. Perilla (57) ABSTRACT Disclosed are various embodiments for a trust establishment application. Machine instances executed in the same computing environment generate side channel patterns embodying data identifying themselves as trusted machine instances. The side channel patterns are detected to determine which machine instances are trusted. An operational mode of a machine instance is configured as a function of whether a quorum of trusted machine instances are executed in the computing environment.

20 Claims, 4 Drawing Sheets

ESTABLISHING TRUST USING SIDE CHANNELS

CROSS-REFERENCE TO RELATED APPLICATIONS

This application is a continuation of and claims priority to U.S. application Ser. No. 13/974,378 titled "ESTABLISHING TRUST USING SIDE CHANNELS", filed Aug. 23, 2013, which is incorporated herein by reference in its entirety.

BACKGROUND

A computing environment may execute multiple machine instances on behalf of many users or customers. The machine instances may be configured to execute confidential or sensitive operations, or configured to perform these operations on confidential, sensitive, or valuable data. The machine instances are often insulated from communicating amongst themselves. This creates difficulties in identifying the machine instances executed in the computing environment and establishing trust to execute these operations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The operations of a computing environment may be reflected in observable aspects of the physical implementation of the computing environment, or "side channels." For example, executing certain operations may result in an observable change in power usage, an observable pattern of cache or disk activity, or other side channel patterns. Some computing environments execute multiple machine instances. The operations of these machine instances may result in side channel patterns which are observable by other machine instances sharing the same physical implementation within the computing device. The operations of the machine instances or the affected data may be monitored or otherwise detected by observing the side channel patterns. This creates a risk that confidential operations or data may be compromised by a machine instance observing the side channel patterns.

Machine instances associated with different customers may be executed in the same computing device. Because the operations of the respective machine instances may be detected by monitoring the side channels, it is beneficial to establish a trust relationship between the machine instances executed on the same computing device. The identities of the customers associated with the machine instances are often unknown to the other customers. Additionally, machine instances may be insulated from communicating with each other via direct communications channels.

A trust establishment application determines whether other machine instances executed in the computing device are trusted machine instances. This is performed by generating a side channel pattern which embodies a request for a communication from the other machine instances confirming their trustworthiness. The requested communication may be a customer identifier, a predetermined shared secret, a digitally signed communication, or other data. Upon detecting the side channel pattern, the other machine instances generate side channel patterns embodying the requested communication. The trust establishment application then determines if the machine instance corresponding to a respective response communication is trustworthy as a function of the content of the communication.

If a quorum of the other machine instances includes trusted machine instances, then the trust establishment application configures the machine instance to operate in a trusted operational mode. Otherwise, the trust establishment application configures the machine instance to operate in an untrusted operational mode. In an untrusted operational mode, operations, processes, services, or other functionality of the machine instance may be prohibited or otherwise restricted. Additionally, access to data may also be restricted in an untrusted operational mode.

In the following discussion, a general description of the system and its components is provided, followed by a discussion of the operation of the same.

Figure 1:
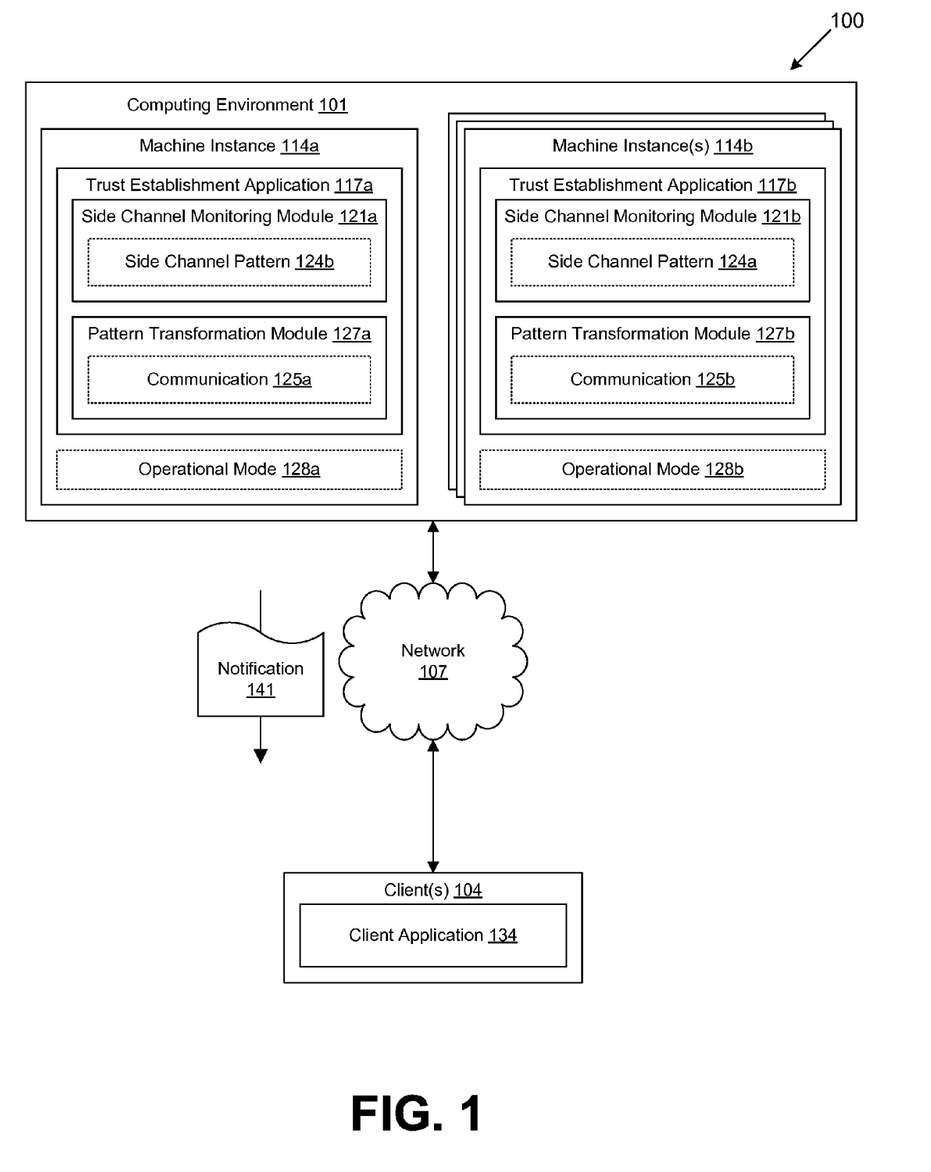
FIG. 1 is a drawing of a networked environment according to various embodiments of the present disclosure.

With reference to FIG. 1, shown is a networked environment 100 according to various embodiments. The networked environment 100 includes a computing environment 101 and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 101 may comprise, for example, a server computer or any other system providing computing capability. Alternatively, the computing environment 101 may employ a plurality of computing devices that may be arranged, for example, in one or more server banks or computer banks or other arrangements. Such computing devices may be located in a single installation or may be distributed among many different geographical locations. For example, the computing environment 101 may include a plurality of computing devices that together may comprise a hosted computing resource, a grid computing resource and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. The components executed in the computing environment 101, for example, include machine instances 114a and 114b, and other applications, services, processes, systems, engines, or functionality not discussed in detail herein. The machine instances 114a/b comprise virtualized instances of operating systems executed to simulate the operations of a computing device. Various applications, services, processes, or other functionality may be executed within the machine instances 114a/b.

Also executed in the machine instances 114a/b are respective trust establishment applications 117a/b. The trust establishment application 117a/b is executed to determine whether others of the machine instances 114a/b are trusted machine instances 114a/b. A trusted machine instance 114a/b may comprise a machine instance 114a/b associated with a trusted or identified user or customer. A trusted machine instance 114a/b may also comprise a machine instance 114a/b in possession of a shared secret, certificate, or other data verifying the trustworthiness of the machine instance 114a/b.

To this end, the trust establishment application 117a/b implements a side channel monitoring module 121a/b to monitor the physical implementation of the computing environment 101 to detect side channel patterns 124a/b. This may include monitoring disk usage, processor usage, cache usage, power usage, and other attributes of the computing environment 101. Side channel patterns 124a/b comprise patterns or activity or usage of components of the physical implementation of the computing environment 101. For example, side channel patterns 124a/b may comprise patterns of page cache misses, disk access activity, disk write latencies, central processing unit (CPU) timings, power activity or usage, or other patterns associated with the physical implementation of the computing environment 101. Side channel patterns 124a/b may embody or otherwise encode communications 125a/b, as will be discussed below. Communications 125a/b comprise information, messages, or other data embodied as side channel patterns 124a/b by the trust establishment application 117a/b for communication between machine instances 114a/b.

The trust establishment application 117a/b also implements a pattern transformation module 127a/b to transform communications 125a/b into side channel patterns 124a/b, and to generate communications 125a/b from side channel patterns 124a/b detected by the side channel monitoring module 121a/b. The machine instances 114a/b may be associated with an operational mode 128a/b. The operational mode 128a/b may define a current state of the machine instance 114a/b which determines which operations, functions, applications, services, data, or other functionality are allowed to be executed or accessed within the machine instance 114a/b.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 134 and/or other applications. The client application 134 may be executed in a client 104, for example, to access network content served up by the computing environment 101 and/or other servers. To this end, the client application 134 may comprise, for example, a browser, a dedicated application, etc. The client 104 may be configured to execute applications beyond the client application 134 such as, for example, email applications, social networking applications, word processors, spreadsheets, and/or other applications.

Next, a general description of the operation of the various components of the networked environment 100 is provided. To begin, an instance of the trust establishment application 117a executed in a machine instance 114a communicates a request communication 125a to machine instances 114b soliciting a response to determine if the machine instances 114b are trusted machine instances. This may comprise the pattern transformation module 127a determining a side channel pattern 124a embodying the request communication 125a. This may comprise, for example, loading a predetermined side channel pattern 124a corresponding to a request communication 125a, dynamically calculating a side channel pattern 124a according to an encoding scheme or format, or another approach.

The trust establishment application 117a then performs one or more operations which generate the side channel pattern 124a in the computing environment 101. For example, the trust establishment application 117a may perform processes or operations which, upon execution, results in a predicted pattern of CPU timings, cache activity, or other activity with respect to the physical implementation of the computing environment 101. Side channel patterns 124a embodying the request communication 125a may also be generated in the computing environment 101 by another approach.

Next, a side channel monitoring module 121b of an instance of the trust establishment application 117b executed in machine instances 114b detects the side channel pattern 124a embodying the request communication 125a. This may comprise, for example, executing a service, daemon, or agent which monitors the physical implementation of the computing environment 101 and determining whether activity matches a side channel pattern 124a corresponding to a request communication 125a. This may be performed in conjunction with the pattern transformation module 127b to transform detected side channel patterns 124b into corresponding communications 125a and determining if the communication 125a comprises a request communication 125a.

In response to the request communication 125a, the pattern transformation module 127b determines a side channel pattern 124b embodying a response communication 125b. The response communication 125b comprises data that identifies the respective machine instance 114b as a trusted machine instance. For example, the response communication 125b may comprise a shared secret known to trusted machine instances 114a/b. The response communication 125b may also comprise an identifier of a user or customer associated with the respective machine instance 114b. This may comprise contact information, names, email addresses, unique identifiers, or other identifying data.

The response communication 125b may also be encrypted. For example, the response communication 125b may be encrypted by applying a public key associated with the machine instance 114a for decryption by applying a private key. As another example, the response communication 125b may be encrypted by applying a symmetric key accessible to trusted machine instances 114a/b. Additionally, the response communication 125b may be signed using a digital signature associated with a machine instance 114b generating the response communication 125b. Other approaches may also be used to generate the response communication 125b.

After the pattern transformation module 127b determines a side channel pattern 124b embodying the response communication 125b, the instance of the trust establishment application 117*b* executed in machine instances 114*b* executes operations or functions that result in generating the side channel pattern 124*b* embodying the response communication 125*b* in the computing environment 101. This may be performed by a similar approach as was discussed above with respect to generating the side channel pattern 124*a* embodying the request communication 125*a*. The side channel patterns 124*a/b* embodying the request communication 125*a* and the response communication 125*b* may correspond to similar or distinct components of the physical implementation of the computing environment 101. For example, the side channel pattern 124*a* embodying the request communication 125*a* may correspond to a pattern of power usage, while the side channel pattern 124*b* embodying the response communication 125*b* may correspond to a pattern of disk activity. The side channel pattern 124*b* embodying the response communication 125*b* may also be generated by another approach.

Next, the side channel monitoring module 121*a* of the trust establishment application 117*a* detects the side channel patterns 124*b* embodying the response communications 125*b* corresponding to machine instances 114*b*. The pattern transformation module 127*a* then generates the response communications 125*b* from the detected side channel patterns 124*b*.

Next, the trust establishment application 117*a* executed in the machine instance 114*a* then determines if the machine instances 114*b* include a quorum of trusted machine instances 114*b*. The quorum may comprise the entirety of the machine instances 114*b*, a number of machine instances 114*b* meeting or exceeding a threshold, or another number of machine instances 114*b*. This may comprise, for example, determining if the response communication 125*b* corresponds to a shared secret known to trusted machine instances 114*a/b*. The machine instance 114*b* would then be determined to be a trusted machine instance 114*b* responsive to the response communication 125*b* corresponding to the shared secret.

In other embodiments, this may comprise comparing identifying information embodied in the response communication 125*b* to a predefined whitelist of customers whose corresponding machine instances 114*b* are trusted. This may also comprise comparing identifying information embodied in the response communication to a blacklist of customers or users whose corresponding machine instances 114*b* are untrusted.

In further embodiments, this may comprise determining the integrity of the response communication 125*b*. For example, the trust establishment application 117*a* may calculate a checksum, hash, digital signature, or other value generated as a function of the response communication 125*b*. The generated value is then compared to a value included in the response communication 125*b*. If the values match, the integrity is confirmed and the machine instance 114*b* may be trusted. If the values differ, the integrity of the response communication 125*b* has been compromised and the machine instance 114*b* is untrusted.

In some embodiments the trust establishment application 117*a* may also determine if a machine instance 114*b* has failed to respond to the request communication 125*a*. This may comprise, for example, comparing a number of generated response communications 125*b* to a known or estimated number of machine instances 114*b* executed in the computing environment 101. Estimating the number of machine instances 114*b* executed in the computing environment 101 may comprise, for example, calculating an estimated amount of resources allocated to machine instances 114*a/b*. This may be performed by machine instances 114*a/b* performing test operations such as memory allocations, disk usages, or other operations. The estimated amount of allocated resources may then be compared to known or typical resource configurations to determine if the difference falls below a threshold.

For example, if it is estimated that sixteen gigabytes of memory have been allocated to machine instances 114*a/b* and a typical configuration for a computing environment 101 is sixteen gigabytes of memory, it is inferred that the total amount of memory of the has been allocated to responding machine instances 114*a/b*. However, if it is estimated that thirteen gigabytes of memory have been allocated to machine instances 114*a/b* and a typical configuration for a computing environment 101 is sixteen gigabytes of memory, it is inferred that a portion of the memory has been allocated to a non-responding machine instance 114*b*.

If a machine instance 114*b* has not responded, the instance of trust establishment application 117*a* executed in the machine instance 114*a* may automatically determine that there is no quorum of trusted machine instances 114*b*. The trust establishment application 117*a* may also consider an unresponsive machine instance 114*b* as an untrusted machine instance 114*b* for purposes of determining of there is a quorum of trusted machine instances 114*b*. Other actions may also be taken in response to an unresponsive machine instance 114*b*.

If the instance of trust establishment application 117*a* executed in the machine instance 114*a* determines that there is a quorum of trusted machine instances 114*b*, the trust establishment application 117 may modify the operational mode 128*a* of the machine instance 114*a* to a trusted operational mode 128*a*. In a trusted operational mode 128*a*, the machine instance 114*a* may execute applications, operations, services, or other functionality not executable in an untrusted operational mode 128*a*. Additionally, in a trusted operational mode 128*a*, the machine instance 114*a* may access data not normally accessible in an untrusted operational mode 128*a*. Other actions may also be taken in a trusted operational mode 128*a*.

If the instance of trust establishment application 117 executed in the machine instance 114*a* determines that there is no quorum of trusted machine instances 114*b*, the trust establishment application 117*a* may modify the operational mode 128*a* of the machine instance 114*a* to an untrusted operational mode 128*a*. In an untrusted operational mode 128*a*, applications, operations, services, or other functionality executable in a trusted operational mode 128*a* may be prohibited or otherwise restricted. Additionally, in an untrusted operational mode 128*a*, the machine instance 114*a* may have limited, prohibited, or otherwise restricted access to data normally accessible in a trusted operational mode 128*a*. Other actions may also be taken in an untrusted operational mode 128*a*.

Additionally, other actions may be taken in response to determining that there is no quorum of trusted machine instances 114*b*. For example, the trust establishment application 117*a* may communicate a notification 141 to a client 104 associated with the machine instance 114*a* indicating that there is no quorum of machine instances 114*a/b*. The notification 141 may comprise, for example, an email message, Short Message Service (SMS) message, push notification, or other data. The notification 141 may also comprise network content encoded for rendering by a client application 134. In some embodiments, the notification 141 may solicit a response from the client 104 as to an action to be taken responsive to there being no quorum of trusted machine instances 114b. For example, if a machine instance 114a is currently operating in a trusted operational mode 128a, the notification 141 may solicit a response as to whether to switch to an untrusted operational mode 128a in response to determining that the machine instance 114a is no longer operating in a trusted operational mode 128a. Other actions may also be taken in response to there being no quorum of trusted machine instances 114a/b.

In some embodiments, machine instances 114b may repeatedly generate side channel patterns 124b embodying response communications 125b or other data at a predefined interval or responsive to another event. This alerts monitoring machine instances 114a/b that a respective machine instance 114b is still executed. In such an embodiment, if the repeatedly generated side channel patterns 124b cease to be detected, it is inferred that the respective machine instance 114b is no longer executed. This may create the possibility of an untrusted machine instance 114b being executed using the newly freed resources. In such an embodiment, the trust establishment application 117a executed in the machine instance 114a may generate a side channel pattern 124a embodying a request communication 125a to repeat the process of determining if there is a quorum of trusted machine instances 114b as was discussed above.

Figure 2:
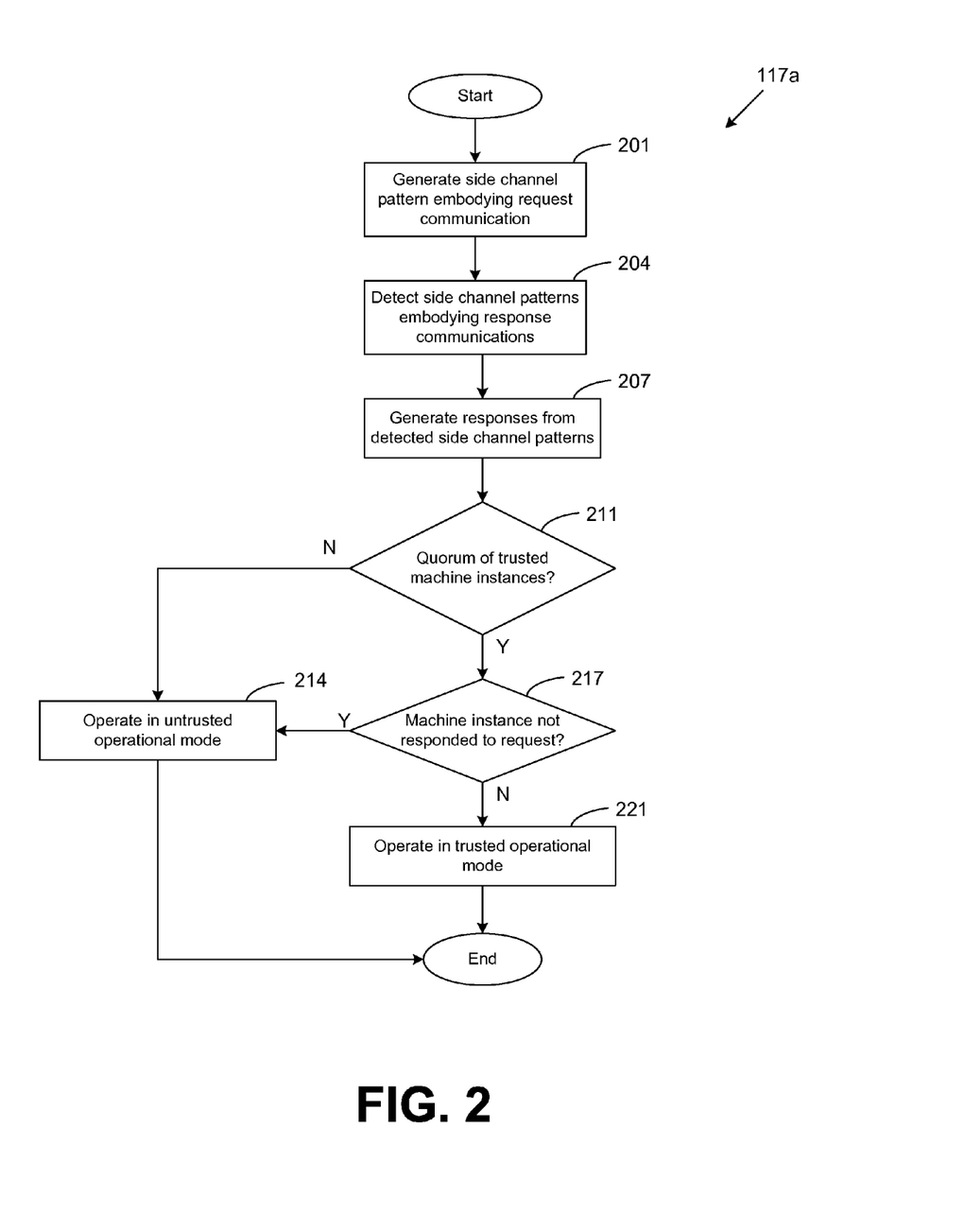
FIGS. 2 and 3 are flowcharts illustrating examples of functionality implemented as portions of a trust establishment application executed in a computing environment in the networked environment of FIG. 1 according to various embodiments of the present disclosure.

Referring next to FIG. 2, shown is a flowchart that provides one example of the operation of a portion of the trust establishment application 117a executed in a machine instance 114a (FIG. 1) according to various embodiments. It is understood that the flowchart of FIG. 2 provides merely an example of the many different types of functional arrangements that may be employed to implement the operation of the portion of the trust establishment application 117a as described herein. As an alternative, the flowchart of FIG. 2 may be viewed as depicting an example of elements of a method implemented in the computing environment 101 (FIG. 1) according to one or more embodiments.

Beginning with box 201, the trust establishment application 117a generates a side channel pattern 124a (FIG. 1) embodying a request communication 125a (FIG. 1) soliciting response communications 125b (FIG. 1) indicating the trustworthiness of machine instances 114b (FIG. 1). This may comprise the pattern transformation module 127 (FIG. 1) of the trust establishment application 11a 7 determining a side channel pattern 124a embodying the request communication 125a. This may also comprise performing one or more operations that generate the side channel pattern 124a in the computing environment 101. Side channel patterns 124 embodying the request communication 125a may also be generated in the computing environment 101 by another approach.

Next, in box 204, the side channel monitoring module 121 (FIG. 1) of the instance of the trust establishment application 117a detects the side channel patterns 124b (FIG. 1) embodying the response communications 125b corresponding to machine instances 114b. In box 207, the pattern transformation module 127a (FIG. 1) of the trust establishment application 117a then generates the response communications 125b from the detected side channel patterns 124b.

The trust establishment application 117a then determines in box 211 whether the machine instances 114b include a quorum of trusted machine instances 114b. This may comprise, for example, determining if a number of response communications 125b correspond to a shared secret known to trusted machine instances 114b. In other embodiments, this may comprise a number of response communications 125b including identifying information corresponding predefined whitelist of customers whose corresponding machine instances 114b are trusted. Other approaches may also be used to determine if there is a quorum of trusted machine instances 114b.

If there is no quorum of trusted machine instances 114b, the process proceeds to box 214, where the trust establishment application 117a configures the machine instance 114a to operate in an untrusted operational mode 128a (FIG. 1). Otherwise, the process proceeds to box 214 where the trust establishment application 117a determines if there is a machine instance 114b which did not respond to the request communication 125a. This may comprise, for example, comparing a number of generated response communications 125b to a known or estimated number of machine instances 114b executed in the computing environment 101.

Estimating the number of machine instances 114b executed in the computing environment 101 may comprise, for example, calculating an estimated amount of resources allocated to machine instances 114a/b. This may be performed by machine instances 114a/b performing test operations such as memory allocations, disk usages, or other operations. The estimated amount of allocated resources may then be compared to known or typical resource configurations to determine if the difference falls below a threshold. Determining if there is a machine instance 114b which did not respond to the request communication 125a may also be performed by another approach.

If there is a machine instance 114b which did not respond to the request communication 125a, the process moves to box 214 where the machine instance 114a is configured to operate in an untrusted operational mode 128a. Otherwise, the process advances from box 217 to box 221 where the machine instance is configured to operate in a trusted operational mode 128a. After configuring the operational mode 128a of the machine instance 114a in boxes 214 or 221, the process ends.

Figure 3:
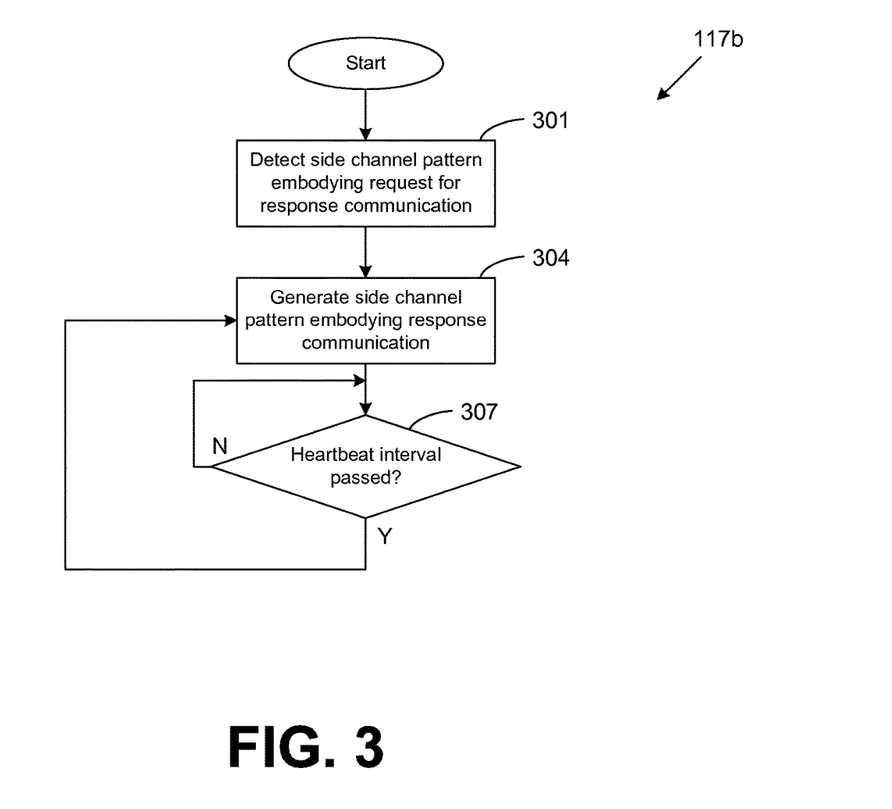

Turning now to FIG. 3, shown is a flowchart that provides another example of the operation of a portion of the trust establishment application 117b executed in a machine instance 114b (FIG. 1) according to various embodiments. It is understood that the flowchart of FIG. 3 provides merely an example of the many different types of functional arrangements that may be employed to implement the operation of the portion of the trust establishment application 117b as described herein. As an alternative, the flowchart of FIG. 3 may be viewed as depicting an example of elements of a method implemented in the computing environment 101 (FIG. 1) according to one or more embodiments.

Beginning with box 301, a side channel monitoring module 121b (FIG. 1) of the trust establishment application 117b detects a side channel pattern 124a (FIG. 1) embodying a request communication 125a (FIG. 1) generated by a machine instance 114a (FIG. 1). This may comprise, for example, executing a service, daemon, or agent which monitors the physical implementation of the computing environment 101 and determining when activity matches a side channel pattern 124a corresponding to a request communication 125a. This may be performed in conjunction with the pattern transformation module 127b (FIG. 1) to transform detected side channel patterns 124a into corresponding communications 125a and determining if the communication 125a comprises a request communication 125a.

In response to the request communication 125, in box 304, the pattern transformation module 127b determines a side channel pattern 124b (FIG. 1) embodying a response communication 125b (FIG. 1). The response communication 125b comprises data which identifies the machine instance 114b as a trusted machine instance 114b. For example, the response communication 125b may comprise a shared secret known to trusted machine instances 114a/b. The response communication 125b may also comprise an identifier of a user or customer associated with the respective machine instance 114b. This may comprise contact information, names, email addresses, unique identifiers, or other identifying data. Additionally, the response communication 125b may be encrypted, digitally signed, or have other functions applied to it to ensure the authenticity or integrity of the response communication 125b. The instance of the trust establishment application 117b then executes operations or functions which result in generating the side channel pattern 124b embodying the response communication 125 in the computing environment 101.

In box 307, the trust establishment application 117b determines if a predefined heartbeat interval has passed. The heartbeat interval may comprise a predefined amount of time, a predefined number of events or conditions, or other criteria. If the heartbeat interval has not passed, the process repeats box 307 until the heartbeat interval has passed. Upon the passing of the heartbeat interval, the process repeats box 304, thereby repeatedly generating the side channel pattern 124b embodying the response communication 125b.

Figure 4:
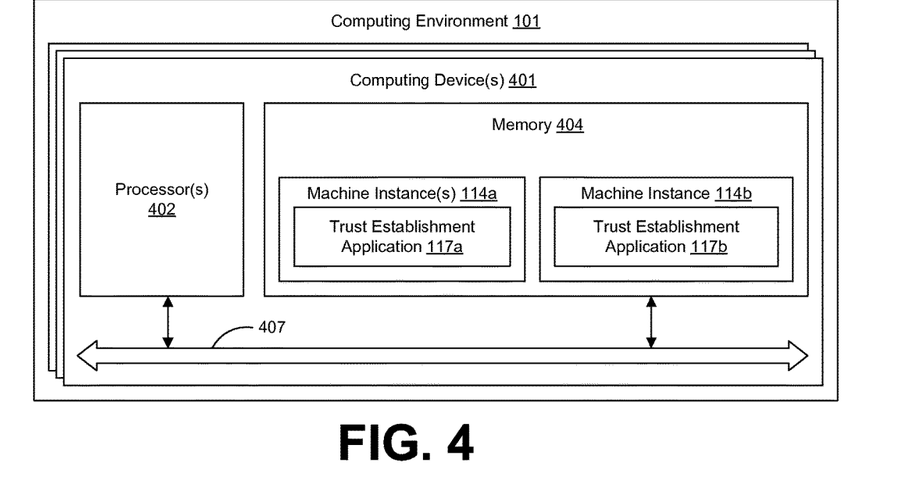
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 101 according to an embodiment of the present disclosure. The computing environment 101 includes one or more computing devices 401. Each computing device 401 includes at least one processor circuit, for example, having a processor 402 and a memory 404, both of which are coupled to a local interface 407. To this end, each computing device 401 may comprise, for example, at least one server computer or like device. The local interface 407 may comprise, for example, a data bus with an accompanying address/control bus or other bus structure as can be appreciated.

Stored in the memory 404 are both data and several components that are executable by the processor 402. In particular, stored in the memory 404 and executable by the processor 402 are machine instances 114a and 114b, each executing an instance of a respective trust establishment application 117a/b, and potentially other applications. In addition, an operating system may be stored in the memory 404 and executable by the processor 402.

It is understood that there may be other applications that are stored in the memory 404 and are executable by the processor 402 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 404 and are executable by the processor 402. In this respect, the term "executable" means a program file that is in a form that can ultimately be run by the processor 402. Examples of executable programs may be, for example, a compiled program that can be translated into machine code in a format that can be loaded into a random access portion of the memory 404 and run by the processor 402, source code that may be expressed in proper format such as object code that is capable of being loaded into a random access portion of the memory 404 and executed by the processor 402, or source code that may be interpreted by another executable program to generate instructions in a random access portion of the memory 404 to be executed by the processor 402, etc. An executable program may be stored in any portion or component of the memory 404 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 404 is defined herein as including both volatile and nonvolatile memory and data storage components. Volatile components are those that do not retain data values upon loss of power. Nonvolatile components are those that retain data upon a loss of power. Thus, the memory 404 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 402 may represent multiple processors 402 and/or multiple processor cores and the memory 404 may represent multiple memories 404 that operate in parallel processing circuits, respectively. In such a case, the local interface 407 may be an appropriate network that facilitates communication between any two of the multiple processors 402, between any processor 402 and any of the memories 404, or between any two of the memories 404, etc. The local interface 407 may comprise additional systems designed to coordinate this communication, including, for example, performing load balancing. The processor 402 may be of electrical or of some other available construction.

Although the trust establishment application 117a/b, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the trust establishment application 117a/b. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 402 in a computer system or other system. The machine code may be converted from the source code, etc.

If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the trust establishment application 117a/b, that comprises software or code can be embodied in any non-transitory computer-readable medium for use by or in connection with an instruction execution system such as, for example, a processor 402 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the trust establishment application 117a/b, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 401, or in multiple computing devices in the same computing environment 101. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying computer-readable instructions executable in at least one computing device, the at least one computing device executing a plurality of machine instances, and the computer-readable instructions, when executed, directing the at least one computing device to at least:
    detect at least one side channel pattern based at least in part on a pattern of activity of a physical implementation of the at least one computing device, the side channel pattern embodying at least one communication from at least one of the plurality of machine instances;
    transform the at least one side channel pattern to generate the at least one communication;
    determine, based at least in part on content in the at least one communication, whether the plurality of machine instances comprises a quorum of trusted machine instances; and
    initiate at least one action in response to whether the plurality of machine instances comprises a quorum of trusted machine instances.

2. The non-transitory computer-readable medium of claim 1, wherein, to initiate the at least one action, the at least one computing device is directed to:
    configure at least one of the plurality of machine instances to operate in an untrusted operational mode in response to the plurality of machine instances not comprising a quorum of trusted machine instances; and
    configure the at least one of the plurality of machine instances to operate in a trusted operational mode in response to the plurality of machine instances comprising a quorum of trusted machine instances.

3. The non-transitory computer-readable medium of claim 1, wherein the side channel pattern comprises at least one of a page cache miss pattern, a disk usage pattern, a disk latency pattern, a central processing unit timing pattern or a power usage pattern.

4. A system, comprising:
    a memory device embodying computer-readable instructions; and
    at least one computing device configured, through execution of the computer-readable instructions, to at least:
        execute a plurality of machine instances;
        detect at least one side channel pattern based at least in part on a pattern of activity of a physical implementation of the at least one computing device, the side channel pattern embodying at least one communication from at least one of the plurality of machine instances;
        transform the at least one side channel pattern to generate the at least one communication;

determine, based at least in part on content in the at least one communication, whether the plurality of machine instances comprises a quorum of trusted machine instances; and initiate at least one action in response to whether the plurality of machine instances comprises a quorum of trusted machine instances.

5. The system of claim 4, wherein, to initiate the at least one action, the at least one computing device is configured to:

configure at least one of the plurality of machine instances to operate in an untrusted operational mode in response to the plurality of machine instances not comprising a quorum of trusted machine instances; and configure the at least one of the plurality of machine instances to operate in a trusted operational mode in response to the plurality of machine instances comprising a quorum of trusted machine instances.

6. The system of claim 5, wherein, in the untrusted operational mode, the at least one of the plurality of machine instances restricts an execution of at least one operation.

7. The system of claim 5, wherein, in the untrusted operational mode, the at least one of the plurality of machine instances prohibits access to at least a portion of data.

8. The system of claim 4, wherein the at least one computing device is configured to detect the at least one side channel pattern repeatedly at a predefined interval.

9. The system of claim 8, wherein the predefined interval is based at least in part on an occurrence of a predefined number of events or a satisfaction of a predefined number of conditions.

10. The system of claim 4, wherein the at least one communication comprises a shared secret.

11. The system of claim 10, wherein the shared secret is encrypted using symmetric key encryption.

12. The system of claim 4, wherein:

the pattern of activity comprises a first pattern of activity; and the at least one computing device is further configured to produce a second pattern of activity of the physical implementation of the at least one computing device, the second pattern of activity comprising another side channel pattern embodying a request to generate the at least one side channel pattern embodying the at least one communication.

13. The system of claim 12, wherein the at least one computing device is further configured to at least:

determine whether one of the plurality of machine instances failed to respond to the request; and initiate at least one other action in response to whether the one of the plurality of machine instances failed to respond to the request.

14. The system of claim 12, wherein, to determine whether one of the plurality of machine instances failed to respond to the request, the computing device is further configured to compare an actual amount of usage of computational resources of the at least one computing device to an estimated amount of usage of computational resources of the at least one computing device by the plurality of machine instances.

15. A method, comprising:

executing, by at least one computing device, a plurality of machine instances;

detecting, by the at least one computing device, at least one side channel pattern based at least in part on a pattern of activity of a physical implementation of the at least one computing device, the side channel pattern embodying at least one communication from at least one of the plurality of machine instances;

transforming, by the at least one computing device, the at least one side channel pattern to generate the at least one communication;

determining, by the at least one computing device, based at least in part on content in the at least one communication, whether the plurality of machine instances comprises a quorum of trusted machine instances; and initiating, by the at least one computing device, at least one action in response to whether the plurality of machine instances comprises a quorum of trusted machine instances.

16. The method of claim 15, wherein:

the pattern of activity comprises a first pattern of activity; and the method further comprises producing a second pattern of activity of the physical implementation of the at least one computing device, the second pattern of activity comprising another side channel pattern embodying a request to generate the at least one side channel pattern embodying the at least one communication.

17. The method of claim 16, wherein determining whether the plurality of machine instances comprises a quorum of trusted machine instances comprises determining that there is no quorum of trusted machine instances in response to one of the plurality of machine instances failing to respond to the request.

18. The method of claim 16, further comprising comparing a number of the plurality of machine instances that respond to the request to an estimated number of the plurality of machine instances or a known number of the plurality of machine instances.

19. The method of claim 18, further comprising calculating, by the at least one computing device, the estimated number of the plurality of machine instances based at least in part on an amount of computational resources used in the at least one computing device and at least one machine instance resource configuration.

20. The method of claim 16, wherein the first pattern of activity and the second pattern of activity correspond to distinct components of the at least one computing device.

* * * * *